US006250430B1

(12) United States Patent
Kyrtsos

(10) Patent No.: US 6,250,430 B1
(45) Date of Patent: Jun. 26, 2001

(54) SYSTEM AND METHOD FOR DETERMINING BRAKE LINING WEAR USING A TEMPERATURE DETECTOR AND A BRAKE ACTUATION SYSTEM

(75) Inventor: Christos Kyrtsos, Southfield, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/198,628

(22) Filed: Nov. 24, 1998

(51) Int. Cl.$^7$ ................................................ F16D 66/00
(52) U.S. Cl. ...................... 188/1.11 L; 374/141; 303/20; 340/454
(58) Field of Search .................. 188/1.11 W, 1.11 L, 188/1.11 E, 1.11 R, 79.52; 73/121, 129; 340/449, 454, 453; 192/30 W; 116/208; 324/716, 700; 374/135, 153, 179, 7, 141, 111, 110, 163; 377/15, 16, 25; 701/29, 30

(56) References Cited

U.S. PATENT DOCUMENTS

| | | | |
|---|---|---|---|
| 1,957,051 | 5/1934 | Norton | 73/32 |
| 2,117,027 | 5/1938 | Langbein | 73/341 |
| 2,494,269 | 1/1950 | Sparkes | 177/311 |
| 3,088,549 | 5/1963 | Borsa | 188/1 |
| 3,314,618 | 4/1967 | McDonald | 241/299 |
| 3,321,045 | 5/1967 | Veilleux | 188/1 |
| 3,398,246 | 8/1968 | Linet | 200/61.4 |
| 3,556,258 | 1/1971 | Winge et al. | 188/1 |
| 3,674,114 | 7/1972 | Howard | 188/1 A |
| 3,689,880 | 9/1972 | McKee et al. | 340/52 A |
| 3,800,278 | 3/1974 | Jaye et al. | 340/52 A |
| 3,805,228 | 4/1974 | Peeples | 340/52 A |
| 3,825,891 | 7/1974 | Kinast | 340/52 A |
| 3,914,734 | 10/1975 | Rigalt | 340/52 A |
| 3,958,445 | 5/1976 | Howard et al. | 73/7 |
| 3,975,706 | 8/1976 | Kato | 340/52 A |
| 4,016,533 | 4/1977 | Ishikawa et al. | 340/52 A |
| 4,020,454 | 4/1977 | Malonee | 340/52 B |
| 4,147,236 | 4/1979 | Steffen et al. | 188/1 A |
| 4,188,613 | 2/1980 | Yang et al. | 340/52 A |
| 4,204,190 | 5/1980 | Wiley et al. | 340/52 A |
| 4,241,603 | 12/1980 | Han et al. | 73/129 |
| 4,298,857 | 11/1981 | Robins et al. | 340/52 A |
| 4,387,789 | 6/1983 | Borugian | 188/1.11 |
| 4,508,196 | 4/1985 | Jamon | 188/1.11 |
| 4,520,661 | 6/1985 | Tamai et al. | 73/129 |
| 4,562,421 | 12/1985 | Duffy | 340/52 A |
| 4,604,604 | 8/1986 | Mann | 340/52 A |
| 4,606,435 | 8/1986 | Johnson | 188/1.11 |
| 4,641,519 | 2/1987 | Klein et al. | 73/129 |
| 4,646,001 | 2/1987 | Baldwin et al. | 324/65 P |
| 4,649,370 | 3/1987 | Thomason | 340/52 B |
| 4,658,936 | 4/1987 | Moseley | 188/1.11 |
| 4,674,326 | 6/1987 | Reinecke | 73/129 |
| 4,790,606 | 12/1988 | Reinecke | 303/103 |

(List continued on next page.)

Primary Examiner—Douglas C. Butler
(74) Attorney, Agent, or Firm—Carlson, Caskey & Olds

(57) ABSTRACT

A system for indicating the amount of material in a brake lining includes a frictional brake surface and a brake lining having a sensor for detecting when the temperature of the brake lining exceeds a predetermined temperature. A brake actuation system actuates the brake lining against the frictional brake surface. A controller counts the number of temperature detections and the number of brake actuations during a predetermined period and produces a first signal when a ratio of the number of temperature detections to the number of brake actuations is equal to or greater than a first predetermined value. In a preferred embodiment of this invention, the controller produces a second signal when the ratio of the number of temperature detections to the number of brake actuations is equal to or greater than a second predetermined value and less than the first predetermined value. The invention further includes a method for determining wear based upon this structure.

14 Claims, 1 Drawing Sheet

U.S. PATENT DOCUMENTS

| | | | |
|---|---|---|---|
| 4,824,260 | 4/1989 | Novotny et al. | 374/179 |
| 4,869,350 | 9/1989 | Fargier et al. | 188/1.11 |
| 4,964,679 | 10/1990 | Rath | 303/100 |
| 4,971,179 | 11/1990 | Gabhardt et al. | 188/33 |
| 5,079,947 | 1/1992 | Feldmanamn et al. | 73/129 |
| 5,151,681 | 9/1992 | Valmir et al. | 340/454 |
| 5,168,260 | 12/1992 | Mery | 340/454 |
| 5,189,391 | 2/1993 | Feldmann et al. | 340/453 |
| 5,302,940 | 4/1994 | Chen | 340/454 |
| 5,307,673 | 5/1994 | Ito et al. | 73/129 |
| 5,372,221 | 12/1994 | Jalbert | 188/1.11 |
| 5,419,415 | 5/1995 | Lamb et al. | 188/1.11 |
| 5,559,286 | 9/1996 | White et al. | 73/129 |
| 5,637,794 | 6/1997 | Hanisko | 73/121 |
| 5,651,431 | 7/1997 | Kyrtsos | 188/1.11 L |
| 5,668,529 | 9/1997 | Kyrtsos | 340/454 |
| 5,825,287 * | 10/1998 | Zarybnicky, Jr. et al. | 188/1.11 W |
| 5,909,171 * | 6/1999 | Kyrtsos | 188/1.11 W |
| 5,939,978 * | 8/1999 | Kyrtsos | 188/1.11 W |
| 5,992,579 * | 11/1999 | Kyrtsos | 188/1.11 L |

* cited by examiner

SYSTEM AND METHOD FOR DETERMINING BRAKE LINING WEAR USING A TEMPERATURE DETECTOR AND A BRAKE ACTUATION SYSTEM

BACKGROUND OF THE INVENTION

This application relates to a system and method for determining the thickness of a brake lining using a temperature detector and a brake actuation system.

Most motor vehicles include a brake system having a set of brake shoe assemblies for retarding the rotation of the wheels of the vehicle when the brakes are applied. Typically, each brake shoe assembly includes a brake lining made of a friction material which gradually wears away during brake applications. After numerous brake applications, the brake lining wears below a critical material thickness and, therefore, should be replaced. As a result, the brake lining must be periodically inspected for excessive wear. Thus, it is desirable to provide an indication when the brake lining thickness is worn such that the brake shoes should be changed.

Several problems arise when trying to determine whether the brake linings have sufficiently worn such that they need to be changed. Often, the wheel must be removed from the vehicle so that the brake lining thickness can be measured. This is cumbersome and time consuming. Visual brake lining wear indicators, such as notches in the lining or color coded layers in the lining, have been used to determine when the linings should be changed. When a visual wear indicator is used, an inspector can visually examine each brake lining to determine whether the brake lining requires replacement without physically measuring the thickness of the brake lining material. However, the use of visual wear indicators can also be cumbersome and time consuming because visual wear indicators require the inspector to visually check each lining while the vehicle is stationary. Thus, it is desirable to have an efficient way to monitor the brake lining thickness during the operation of the vehicle to indicate whether the brake linings require replacement without having to visually inspect each brake lining.

Some prior art systems have monitored brake lining thickness on vehicles by using a brake lining including a single thermistor sensor with the electrical resistance of the thermistor changing with the temperature of the brake lining. Brake lining wear for this system is calculated based on changes in the measured resistance of the thermistor. Such systems can often be ineffective and produce inaccurate results. Other systems have monitored the temperature of the brake linings to compare these monitored temperatures to electronically stored standard characteristics for the brake lining. These systems are complicated and vary from lining to lining due to changing characteristics in lining materials and configurations. Thus, it is desirable to have a simple system and method for determining the thickness of a brake lining using a temperature detector and a brake actuation system.

SUMMARY OF THE INVENTION

In a disclosed embodiment of this invention, a system for indicating the amount of material in a brake lining includes a frictional brake surface and a brake lining having a sensor for detecting when the temperature of the brake lining exceeds a predetermined temperature. A brake actuation system actuates the brake lining against the frictional brake surface. A controller counts the number of temperature detections and the number of brake actuations during a predetermined period and produces a first signal when a ratio of the number of temperature detections to the number of brake actuations is greater than a first predetermined value. In a preferred embodiment of this invention, the controller produces a second signal when the ratio of the number of temperature detections to the number of brake actuations is greater than a second predetermined value and less than the first predetermined value.

The invention includes a method for indicating the amount of material in a brake lining in a brake system having a frictional brake surface, a sensor for detecting when the temperature of the brake lining exceeds a predetermined temperature, and an actuation system for actuating the brake lining against the frictional brake surface. The method includes the steps of: counting the number of brake actuations during a predetermined period, counting the number of temperature detections during the predetermined period, and producing a first signal when a ratio of the number of temperature detections to the number of brake actuations is greater than a first predetermined value. A preferred method includes the step of producing a second signal when the ratio of the number of temperature detections to the number of brake actuations is greater than a second predetermined value and less than the first predetermined value.

These and other features of the present invention will be best understood from the following specification and drawings, the following of which is a brief description.

DETAILED DESCRIPTION OF THE PREFERRED EMBODIMENT

Figure 1:
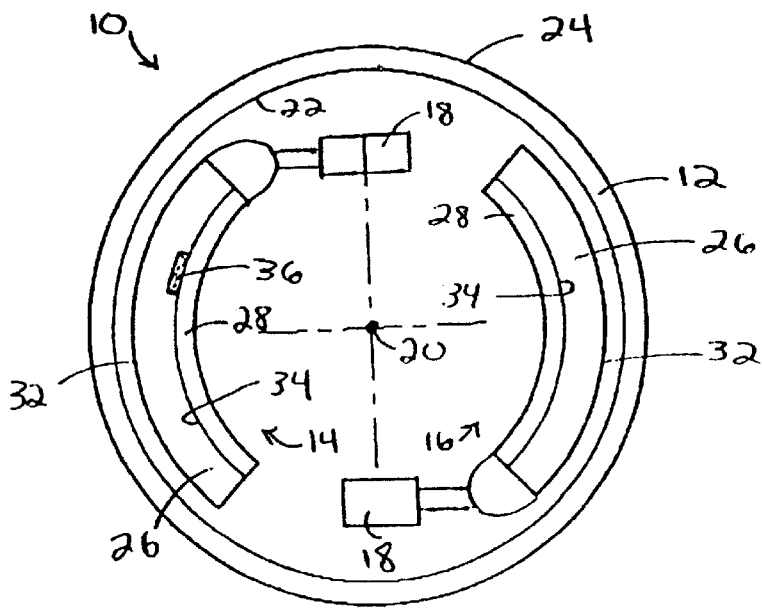
FIG. 1 is a side view of a drum brake system including a brake actuation system and a brake lining having a temperature detector in accordance with the present invention.

Referring to FIG. 1, a brake lining having a temperature detector in accordance with the present invention is shown installed in a vehicular brake system. The brake lining, as described below, may be incorporated into several different types of conventional brake systems including, but not limited to, drum brake systems and disc brake systems. Thus, the brake lining has been illustrated in a drum brake system in FIG. 1 for descriptive purposes only and not to limit the scope of the present invention.

FIG. 1 is a side view of a drum brake system 10. The drum brake system 10 includes a cylindrical brake drum 12, a first brake shoe assembly generally shown at 14, a second brake shoe assembly generally shown at 16, and an actuation system 18. The general operation of the brake drum assembly 10 is known. The first and second brake shoe assemblies 14 and 16 are preferably identical such that a description of the first brake shoe assembly 14 or its components is also applicable to the second brake shoe assembly 16. The drum brake system 10 can be of various types of systems such as an s-can brake, a wedge brake, or a drum brake actuated by a hydraulic cylinder. The actuation system 18, shown schematically in FIG. 1, represents any known actuating mechanism for drum brake systems such as an s-cam mechanism, a wedge mechanism, or a hydraulic cylinder. The actuation system 18 moves the first and second brake shoe assemblies 14 and 16 into contact with the rotating brake drum 12 and can be controlled hydraulically or pneumatically. Also, as known, a single actuator could move both the first and second brake shoe assemblies 14 and 16 into contact with the rotating brake drum 12.

The brake drum 12, which rotates about an axis of rotation 20, has an inner surface 22 and an outer surface 24. The first and second brake shoe assemblies 14 and 16, located adjacent to the inner surface 22 of the brake drum 12, include a brake lining 26 having a predetermined thickness. The brake linings 26 are comprised of a known friction material attached to a backing plate 28. Each brake lining 26 presents a wear surface 32 which contacts the inner surface 22 of the rotating brake drum 12 when the actuation system 18 moves the first and second brake shoe assemblies 14 and 16 against the brake drum 12. Frictional contact between the wear surfaces 32 and the rotating brake drum 12 increases the temperature of each brake lining 26 and wears away the thickness of each brake lining 26. During repetitive brake applications, the temperature of the brake linings 26 may increase beyond a critical temperature resulting in a brake fade condition. After numerous brake applications, the brake linings 26 eventually wear below a critical thickness and, therefore, must be replaced. Each brake lining 26 also includes an interface surface 34 which contacts the backing plate 28.

A temperature detector or sensor 36, shown schematically in FIG. 1, detects when the temperature of the brake lining 26 exceeds a predetermined temperature as a result of brake applications. Frictional contact between the inner surface 22 of the rotating brake drum 12 and the wear surface 32 of the brake lining 26 during brake applications increases the temperature of both the brake lining 26 and the temperature detector 36. In FIG. 1, the temperature detector 36 is embedded in the brake lining 26. Alternatively, the temperature detector 36 may be encapsulated in a housing assembled into the brake lining 26. The temperature detector 36 can be incorporated in either the first and/or the second brake shoe assemblies 14 and 16, but typically need only be incorporated in one, and preferably the leading brake shoe assembly which experiences the most brake lining wear.

Figure 2:
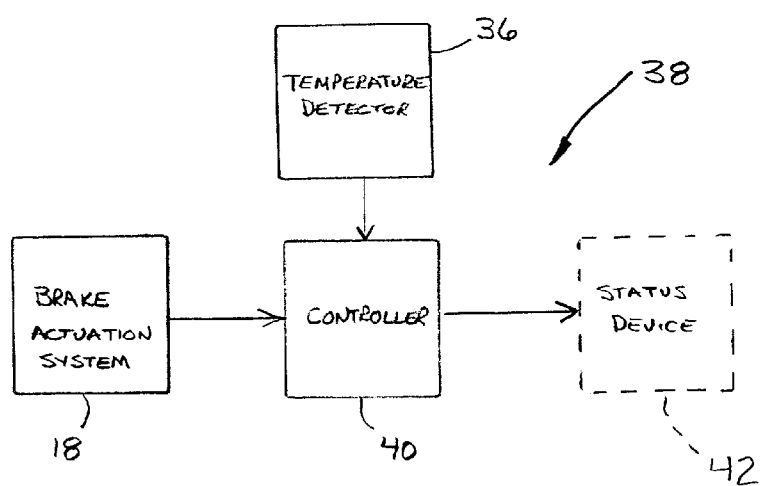
FIG. 2 is an electrical schematic diagram of a system for determining the thickness of a brake lining using a temperature detector and a brake actuation system.

FIG. 2 is an electrical schematic diagram of a system 38 for determining the thickness of the brake lining 26 using the temperature detector 36 and the brake actuation system 18. The system 38 includes the brake lining 26 having the temperature detector 36, the brake actuation system 18, a controller 40, and a frictional brake surface. In the drum brake system 10, as described above, the frictional brake surface is the inner surface 22 of the rotating brake drum 12. Alternatively, in a disc brake system, the frictional brake surface would be the inner or outer surface of a rotor.

As described above, the brake actuation system 18 actuates the brake lining 26 against the frictional brake surface, i.e. the inner surface 22 of the rotating brake drum 12, thereby increasing the temperature of the brake lining 26 and the temperature detector 36 detects when the temperature of the brake lining 26 exceeds a predetermined temperature. The controller 40 is preferably connected to both the temperature detector 36 and the brake actuation system 18 for counting the number of temperature detections and the number of brake actuations during a predetermined period and producing a first signal when a ratio of the number of temperature detections to the number of brake actuations is equal to or greater than a first predetermined value.

Other ways of "counting" actuations, such as detecting movement of either shoe assembly 14 or 16, may also be used. The controller 40 must somehow acquire a count of the number of brake actuations, how the controller 40 acquires the count is not critical.

In a preferred embodiment of the present invention, the controller 40 produces a second signal when the ratio of the number of temperature detections to the number of brake actuations is equal to or greater than a second predetermined value and less than the first predetermined value. In this manner, the second signal can be used to indicate that the thickness of the brake lining 26 has worn to a first thickness level and the first signal can be used to indicate that the thickness of the brake lining 26 has worn to a second or further reduced thickness level. It follows that the first and second signals may be used to activate a remote device 42, such as a light source or an alarm, to indicate the respective thickness of the brake lining 26. The predetermined period during which the number of temperature detections are counted is preferably a preselected number of brake actuations. Further note that the temperature detector 36 could also be used as a means of indicating brake lining thickness in that the detector 36 stops transmitting signals when it has been worn away.

For example, in one embodiment of the present invention, the predetermined temperature may be defined as 200° C., the predetermined period may be defined as 1000 brake applications, the first predetermined value may be set equal to 0.9, and the second predetermined value may be set equal to 0.7. Accordingly, the system 38 will count the number of temperature detections above 200° C. during a period of 1000 brake actuations. The controller 40 will produce the first signal when the ratio of the number of temperature detections above 200° C. to 1000 brake actuations is equal to or greater 0.9, or, in other words, when brake actuations warm the brake lining 26 to a temperature above 200° C. over 90% of the time. The controller 40 will produce the second signal when the ratio of the number of temperature detections above 200° C. to 1000 brake actuations is equal to or greater 0.7 and less than 0.9, or, in other words, when brake actuations warm the brake lining 26 to a temperature above 200° C. between 70–90% of the time. In this manner, the second signal can be used as a cautionary signal to indicate that the brake lining 26 will soon require service, and the first signal can be used as a warning signal to indicate that the brake lining 26 requires replacement. One of ordinary skill in the art will appreciate that the predetermined temperature, predetermined period, predetermined first value, and predetermined second value may be adjusted accordingly to adapt to any particular brake system for producing the desired results of indicating when a brake lining will soon require service and when a brake lining requires replacement.

In accordance with the present invention, the temperature detector 36 may be a thermostatic sensor which approximates an open circuit when the temperature of the sensor exceeds the predetermined temperature or the temperature detector 36 may be a negative temperature coefficient thermistor which approximates a short circuit when the temperature of the thermistor exceeds the predetermined temperature.

The present invention includes a method for indicating the amount of material in the brake lining 26. The steps of the method include: providing a frictional brake surface, a brake lining including a sensor for detecting when the temperature of the brake lining exceeds a predetermined temperature, and an actuation system for actuating the brake lining against the frictional brake surface; counting the number of brake actuations during a predetermined period; counting the number of temperature detections during the predetermined period; and producing a first signal when a ratio of the number of temperature detections to the number of brake actuations is equal to or greater than a first predetermined value. A preferred method includes the step of producing a second signal when the ratio of the number of temperature detections to the number of brake actuations is equal to or greater than a second predetermined value and less than the first predetermined value.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A system for indicating the amount of material in a brake lining comprising:
    a frictional brake surface;
    a brake lining having a thickness including a sensor for detecting when the temperature of said brake lining exceeds a predetermined temperature;
    a brake actuation system for actuating said brake lining against said frictional brake surface; and
    a controller for counting the number of temperature detections and the number of brake actuations during a predetermined period and producing a first signal when a ratio of the number of temperature detections to the number of brake actuations is equal to or greater than a first predetermined value.

2. A system as set forth in claim 1 wherein said controller produces a second signal when the ratio of the number of temperature detections to the number of brake actuations is equal to or greater than a second predetermined value and less than the first predetermined value.

3. A system as set forth in claim 2 wherein said second signal indicates that the thickness of said brake lining has worn to a first thickness level, and said first signal indicates that the thickness of said brake lining has worn to a second thickness level.

4. A system as set forth in claim 2 wherein said predetermined period is a preselected number of brake actuations.

5. A system as set forth in claim 4 wherein said first predetermined value is 90%.

6. A system as set forth in claim 5 wherein said second predetermined value is 70%.

7. A system as set forth in claim 2 wherein said second signal represents a service signal indicating that said brake lining has worn to a first thickness level and said first signal represents a warning signal indicating that said brake lining has worn to a second thickness level that is less than said first thickness level and requires replacement.

8. A system as set forth in claim 1 wherein said sensor is a thermostatic sensor which approximates an open circuit when the temperature of said sensor exceeds the predetermined temperature.

9. A system as set forth in claim 1 wherein said sensor is a negative temperature coefficient thermistor which approximates a short circuit when the temperature of said sensor exceeds the predetermined temperature.

10. A method for indicating the amount of material in a brake lining comprising the steps of:
    1) providing a frictional brake surface, a brake lining including a sensor for detecting when the temperature of the brake lining exceeds a predetermined temperature, and an actuation system for actuating the brake lining against the frictional brake surface;
    2) counting the number of brake actuations during a predetermined period;
    3) counting the number of temperature detections during the predetermined period; and
    4) producing a first signal when a ratio of the number of temperature detections to the number of brake actuations is equal to or greater than a first predetermined value.

11. A method as set forth in claim 10 including the step of producing a second signal when the ratio of the number of temperature detections to the number of brake actuations is equal to or greater than a second predetermined value and less than the first predetermined value.

12. A method as set forth in claim 10 wherein the predetermined period is a preselected number of brake actuations.

13. A method as set forth in claim 12 wherein said first predetermined value is 90%.

14. A method as set forth in claim 12 wherein said second predetermined value is 70%.

* * * * *